US009355270B2

(12) United States Patent
Vieira et al.

(10) Patent No.: US 9,355,270 B2
(45) Date of Patent: May 31, 2016

(54) SECURITY CONFIGURATION SYSTEMS AND METHODS FOR PORTAL USERS IN A MULTI-TENANT DATABASE ENVIRONMENT

(75) Inventors: Alfred Vieira, San Francisco, CA (US); Yongsheng Wu, Redwood City, CA (US); Yanik Grignon, Newton, MA (US); Punit Jain, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 642 days.

(21) Appl. No.: 12/974,248

(22) Filed: Dec. 21, 2010

(65) Prior Publication Data

US 2011/0270885 A1 Nov. 3, 2011

Related U.S. Application Data

(60) Provisional application No. 61/329,044, filed on Apr. 28, 2010.

(51) Int. Cl.
| G06F 17/30 | (2006.01) |
| G06F 21/62 | (2013.01) |
| G06F 21/60 | (2013.01) |
| G06F 21/80 | (2013.01) |

(52) U.S. Cl.
CPC .......... *G06F 21/6227* (2013.01); *G06F 21/604* (2013.01); *G06F 21/6218* (2013.01); *G06F 21/805* (2013.01)

(58) Field of Classification Search
CPC ................ G06F 21/604; G06F 2221/2113
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |

(Continued)

*Primary Examiner* — Miranda Huang
(74) *Attorney, Agent, or Firm* — Ingrassia Fisher & Lorenz, P.C.

(57) ABSTRACT

A computer-implemented system and method includes method includes receiving a data request for data in a database from a user; determining if the user is an internal user or a portal user; consulting, if the user is the internal user, a first security setting associated with the data to determine if the requested data is public or private, and if the user is the portal user, consulting a second security setting separate from the first security setting to determine if the requested data is public or private; providing, if the requested data is public, access information to the user; performing, if the requested data is private, additional processing to determine if the user has access to the requested data.

13 Claims, 3 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,017,183 B1 * | 3/2006 | Frey et al. .......................... 726/5 |
| 7,062,502 B1 | 6/2006 | Kesler |
| 7,334,254 B1 * | 2/2008 | Boydstun et al. ................. 726/2 |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,166,071 B1 * | 4/2012 | Korablev et al. ............... 707/783 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210909 A1 | 10/2004 | Dominquez, Jr. et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 * | 10/2005 | Weissman et al. ............ 707/102 |
| 2005/0283478 A1 | 12/2005 | Choi et al. |
| 2006/0206834 A1 | 9/2006 | Fisher et al. |
| 2008/0082540 A1 * | 4/2008 | Weissman et al. ................ 707/9 |
| 2010/0017415 A1 * | 1/2010 | Kurumai et al. ................ 707/10 |
| 2010/0030845 A1 * | 2/2010 | Junghans et al. ............. 709/203 |
| 2010/0192067 A1 * | 7/2010 | Casalaina .................... 715/742 |

* cited by examiner

SECURITY CONFIGURATION SYSTEMS AND METHODS FOR PORTAL USERS IN A MULTI-TENANT DATABASE ENVIRONMENT

CROSS-REFERENCE TO RELATED APPLICATION

This application claims the benefit of U.S. provisional patent application Ser. No. 61/329,044, filed Apr. 28, 2010, the entire content of which is incorporated by reference herein.

TECHNICAL FIELD

Embodiments of the subject matter described herein relate generally to data processing systems and methods, such as systems and methods that use a common network-based platform to support applications executing on behalf of multiple tenants. More particularly, embodiments of the subject matter relate to security configuration systems and methods for portal users in the multi-tenant database environment.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware. A customer relationship management (CRM) system is one example of an application that is suitable for deployment as a cloud-based service.

Since a cloud-based service provider stores data for a number of different clients, security is an important consideration. However, security applications may consume processing resources and adversely impact performance. Security rules may be complicated by the various types of users that the service provider accommodates, even within a single client, such as internal users within a client and portal users that are external customers of the client. As such, it may be desirable to provide techniques enabling the controlling of access to objects of the database system and/or optimizing a query to an object to improve performance and security of the database system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Broadly, exemplary embodiments discussed herein provide an improved security configuration for accessing a database in multi-tenant database environment. In one exemplary embodiment, the security configuration may include separate default settings for different types of users. Internal users are typically employees of the tenants and portal users are typically customers of the tenant or otherwise external to the tenant organization. As such, the security configuration may provide separate default settings for internal users and portal users, as well as other process optimizations for such user types.

Figure 1:
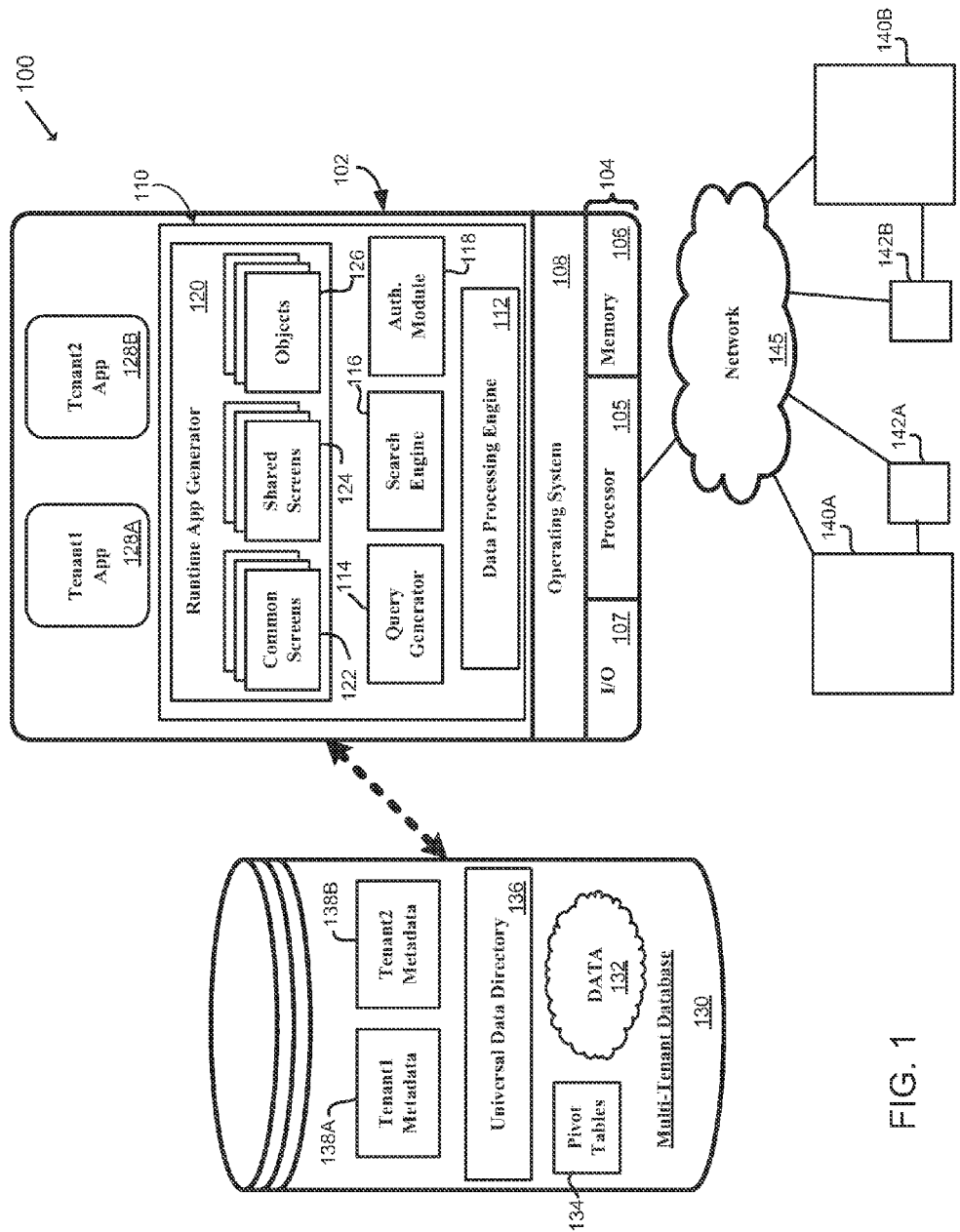
FIG. 1 is a block diagram of a multi-tenant data processing system in accordance with an exemplary embodiment.

FIG. 1 is a block diagram of a multi-tenant data processing system 100 in accordance with an exemplary embodiment. The system 100 suitably includes a server 102 that dynamically creates virtual applications 128 based upon data 132 from a common database 130 that is shared between multiple tenants (or clients). Data and services generated by the virtual applications 128 are provided via a network 145 to any number of client devices 140 (e.g., 140A and 140B) and client devices 142 (e.g., 142B and 142B), as desired. Each virtual application 128 (e.g., 128A and 128B) is suitably generated at run-time using a common application platform 110 that securely provides access to the data 132 in the database 130 for each of the various tenants subscribing to the system 100. In accordance with one non-limiting example, the system 100 may be implemented in the form of a multi-tenant CRM system that can support any number of authenticated users of multiple tenants.

A "tenant" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

Each tenant may further be associated with both internal users and portal (or external) users. The terms internal and portal refer to the relationship of the user with respect to the tenant. As noted above, tenants are typically direct customers of the provider of the system 100, although the tenants may host applications and data on the system 100 for use by customers of the tenants. As such, the internal users are typically employees of the tenant, while portal users are typically customers, suppliers, business partners, affiliates, or other portal users external to the tenant, although the portal users have at least some access to the applications and data of the associated tenant. In FIG. 1, internal client devices 140 are client devices used by internal users to access the system 100 and portal client devices 142 are client devices used by portal users to access the system 100. As discussed in greater detail below, the system 100 provides separate security configurations for internal client devices 140 and portal client devices 142. For example, the tenant may enable portal users to read controlled data associated with the tenant, write or update controlled data associated with the tenant, or otherwise interact with the internal organization of the tenant for functions such as placing orders, filing complaints, and requesting customer service.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous heap-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the client devices 140 and 142. The virtual applications 128 are typically generated at run-time in response to queries received from the client devices 140 and 142. For the illustrated embodiment, the application platform 110 includes a bulk data processing engine 112, a query generator 114, a search engine 116 that provides text indexing and other search functionality, a user authorization module 118, and a runtime application generator 120. Each of these features may be implemented as a separate process or other module, and many equivalent embodiments could include different and/or additional features, components or other modules as desired.

Upon initial engagement with the application platform 110, the user authorization module 118 prompts and receives identification from the client devices 140 and 142. Such identification may include, for example, user names and passwords such that the user authorization module 118 may authorize or prevent further access by the potential user. For example, the user may authenticate his or her identity to the authorization module 118 to obtain a session identifier that identifies the user in subsequent communications with the server 102. As discussed in greater detail below, the user authorization module 118 further identifies the user as an internal user of an internal client device 140 or as a portal user of a portal client device 142. For example, the authentication module 118 may identify the user and user type by accessing a user profile associated with a user ID. Multiple user types may be configured with a variety of capabilities, including the user types used in the security configuration discussed below.

Upon authentication, the runtime application generator 120 dynamically builds and executes the virtual applications 128 in response to specific requests received from the client devices 140 and 142. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request in accordance, for example, with the security configuration discussed below.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc. In certain embodiments, the data processing engine 112 and the processor 105 cooperate in an appropriate manner to perform and manage the various data access monitoring techniques, processes, and methods described in more detail below with reference to FIGS. 2 and 3.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128.

The data and services provided by the server 102 can be retrieved using any sort of personal computer, mobile telephone, tablet or other network-enabled client device 140 and 142 on the network 145. Typically, the user operates a conventional browser or other client program to contact the server 102 via the network 145 using, for example, the hypertext transport protocol (HTTP) or the like. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the client device 140 and 142; other embodiments may simply provide dynamic web or other content that can be presented and viewed by the user, as desired.

Figure 2:
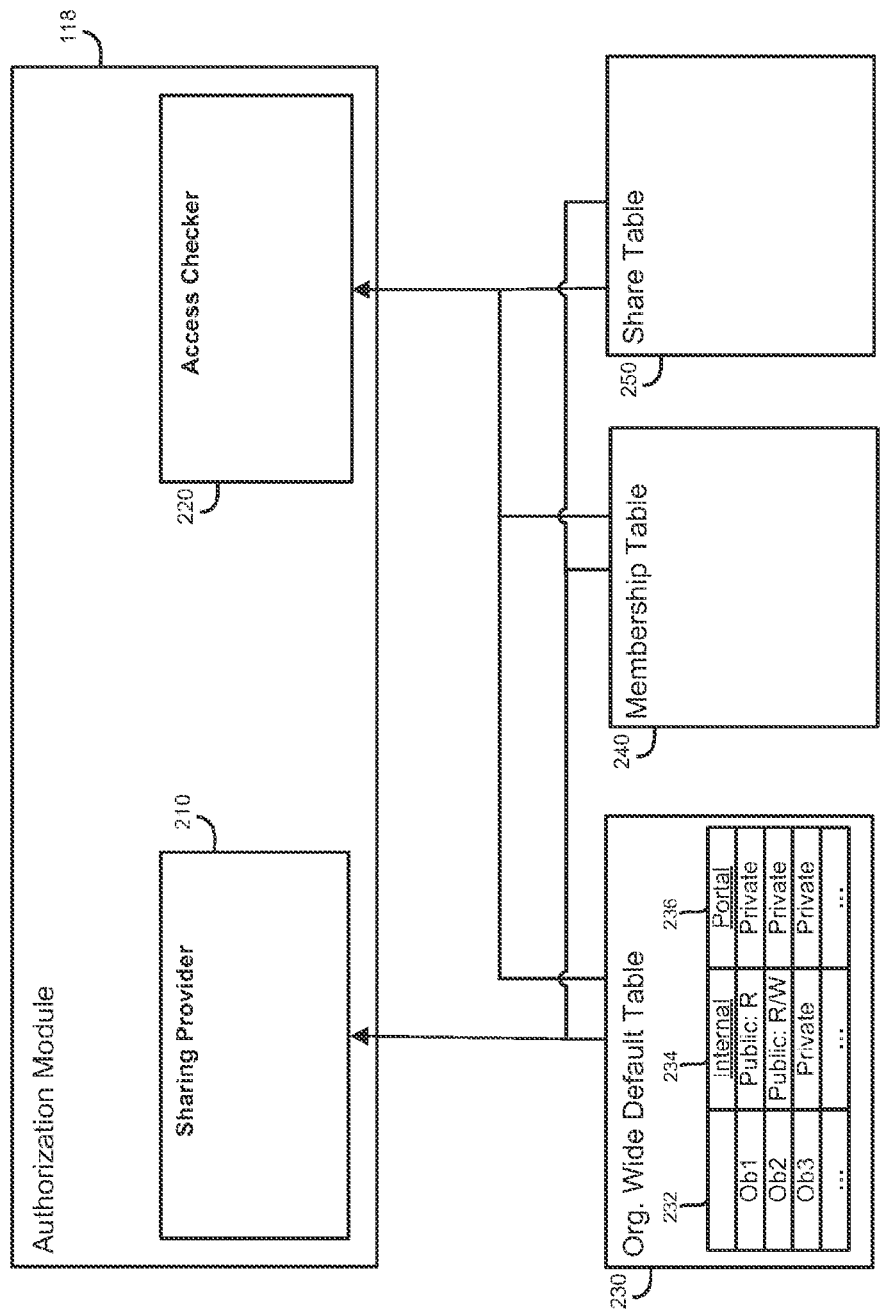
FIG. 2 is a block diagram of a security configuration associated with the multi-tenant data processing system of FIG. 1.

FIG. 2 is a block diagram of a security configuration 200 associated with a data processing system. Although not depicted in FIG. 2, the security configuration 200 could be deployed in the context of a multi-tenant data processing system, such as the system 100 and will be described within the context of the system 100 of FIG. 1. Moreover, FIG. 2 depicts functional modules that might be realized using, for example, one or more processors, a data processing engine, or other computer-implemented logic resident in the system 200.

In general, the security configuration 200 maintains a set of security settings for various data access requests, and the security settings may be based on the user, object, access type, or any other desired characteristic. For the most secure security setting, an individual record may only be accessible to a single user. Generally, however, the processing resources of the security configuration 200 may be optimized by collectively granting access to multiple users and thus avoiding checking the security setting of each individual record for each individual user. With this in mind, the security configuration 200 may maintain any number of security settings based on the characteristics of information (i.e., the type of object) and the characteristics of the user (i.e., certain types and/or groups of users may have access to certain types of objects), as discussed below.

The illustrated embodiment of the security configuration 200 generally includes, without limitation: a sharing provider 210, an access checker 220, an organization wide default table 230, a membership table 240, and a share table 250.

These functional modules are operatively associated with one another, and may be coupled together using any suitable interconnection arrangement or architecture that accommodates data communication as needed. For example, each of the sharing provider 210 and the access checker 220 may be coupled to the membership table 240 and the share table 250. As shown, the sharing provider 210 and access checker 220 may be considered part of the authentication module 118 discussed above in reference to FIG. 1. The membership table 240 and share table 250 may be formed from tenant metadata 138 in the multi-tenant database 130 of FIG. 1.

The security configuration 200 will be initially introduced and additionally described in greater detail below in conjunction with FIG. 3, which is a flow chart of a security configuration method 300 in accordance with an exemplary embodiment. Referring to FIG. 2, the sharing provider 210 and access checker 220 are groups of tables and other processing components that provide access information in response to query requests from devices such as the internal client devices 140 and portal client devices 142 of FIG. 1. As such, the sharing provider 210 and access checker 220 may be facilitated by the query generator 114 of FIG. 1.

As noted above, the sharing provider 210 and access checker 220 have access to the organization wide default table 230 that, for example, may be an object table generally corresponding to any collection of data arranged into predefined categories. In general, each row or record of a table contains an instance of data for each category defined by the fields. In some multi-tenant database systems, standard object tables might be provided for use by all tenants. In the context of the system 100, each type of data object may be further associated with a number of records that represent data of a tenant and/or the overall system 100. Although only one organization wide default table 230 is shown in FIG. 2, the security configuration 200 may include a corresponding default table for each type of object.

The organization wide default table 230 includes one or more rows, each representing an object (e.g., ob1, ob2, ob3) identified in a first column 232. The organization wide default table 230 further includes a second column 234 and a third column 236 that identify the security setting associated with each object. As noted above, each object and record may have an associated security setting the dictates the accessibility of the object and record for each user. As shown in FIG. 2, column 234 lists a security setting for internal users, such as internal client devices 140, and column 236 lists a security setting for portal users, such as portal client devices 142. The security settings in table 230 are the default security settings associated with the designated objects and may be adjusted by the tenant as desired. The function of these security settings will be described below.

For each access request, the security configuration 200 determines whether or not access should be granted based on any number of user, record, and object characteristics, including the nature of the request, default settings in the access checker 220 and sharing provider 210, the group and role memberships of the user, and down to the individual security setting for a particular record.

Generally, and as noted above, each tenant may have a number of internal users, such as employees of the tenant, and portal users, such as the customers of the tenant. Considering that each tenant may have a number of internal users, the tenant may want the default settings of certain objects to be public such that any internal user can access and certain objects as private such that access is more limited. For example, the tenant may designate that the information associated with employee salary as private except for internal users within human resources. However, other objects, such as public corporate documents or corporate directories, may be designated as public to provide any internal user with access. As noted above, the tenant may provide a default security setting for internal users in column 234. Although any suitable indicator may be used, the terms "private" and "public" are listed in table 230 to represent the security setting. The public setting may further define the nature of the public access for a particular object. For example, the tenant may designate that a user may read an object but not perform other functions. This is indicated by "Public: R" in the default table 230. Alternatively, an object that is public for both reading and updating may be indicated by "Public: R/W" in default table 230.

Each tenant may also have a number of portal users that are external to the organization. As in the above, the tenant may want certain objects to have a default setting of public across all portal users and certain objects to have a default setting of private in column 236.

The security settings in the internal columns 234 may be different from the settings in the portal column 236. For example, the tenant may want the corporate email directory to be public with respect to the internal users and private to portal users outside of the organization. Accordingly, the tenant may provide at least two different types of default security settings for two different types of users within the default table 230.

As a general matter, objects with a default security setting of public (e.g., "Public: R" or "Public: R/W") require less processing resources for such an information request since no further access checks are required. If the security setting is private, further tables, such as the membership and share tables 240 and 250 are consulted to determine if the access request should be granted. In general, the membership and share tables 240 and 250 provide the security settings for records according to a particular user. In general, the membership table 240 lists the groups or roles of which the user is a member, and each user may be a member of any number of groups. For example, an internal user may be a member of the human resources group that has access to personnel records. The share table 250 defines, for each object, the groups that have access to records. As such, from the membership table 240 and the share table 250, the security configuration 200 indicates the availability of a requested record for a particular user. The security settings in the default table 230, the membership table 240, and the share table 250 may be adjusted as necessary or desired by the tenant to provide the desired level of security while optimizing processing resources. Although only one share table 250 is shown in FIG. 2, the security configuration 200 may include a corresponding share table for each type of object.

As noted above, FIG. 3 is a flow chart of a method 300 for implementing the security configuration 200 of FIG. 2 within the system 100 of FIG. 1. The various tasks performed in connection with an illustrated process may be performed by software, hardware, firmware, or any combination thereof. For illustrative purposes, the following description of illustrated processes may refer to elements mentioned above in connection with FIG. 1 and FIG. 2. In practice, portions of a described process may be performed by different elements of a system, e.g., a processor, a data processing engine, or a scoring engine. It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the respective process as long as the intended overall functionality remains intact. The process 300 represents one exemplary embodiment of a computer-implemented method of controlling user access in a database system. Although the process 300 can be performed in parallel for any number of concurrent users, this example refers to a single user.

Figure 3:
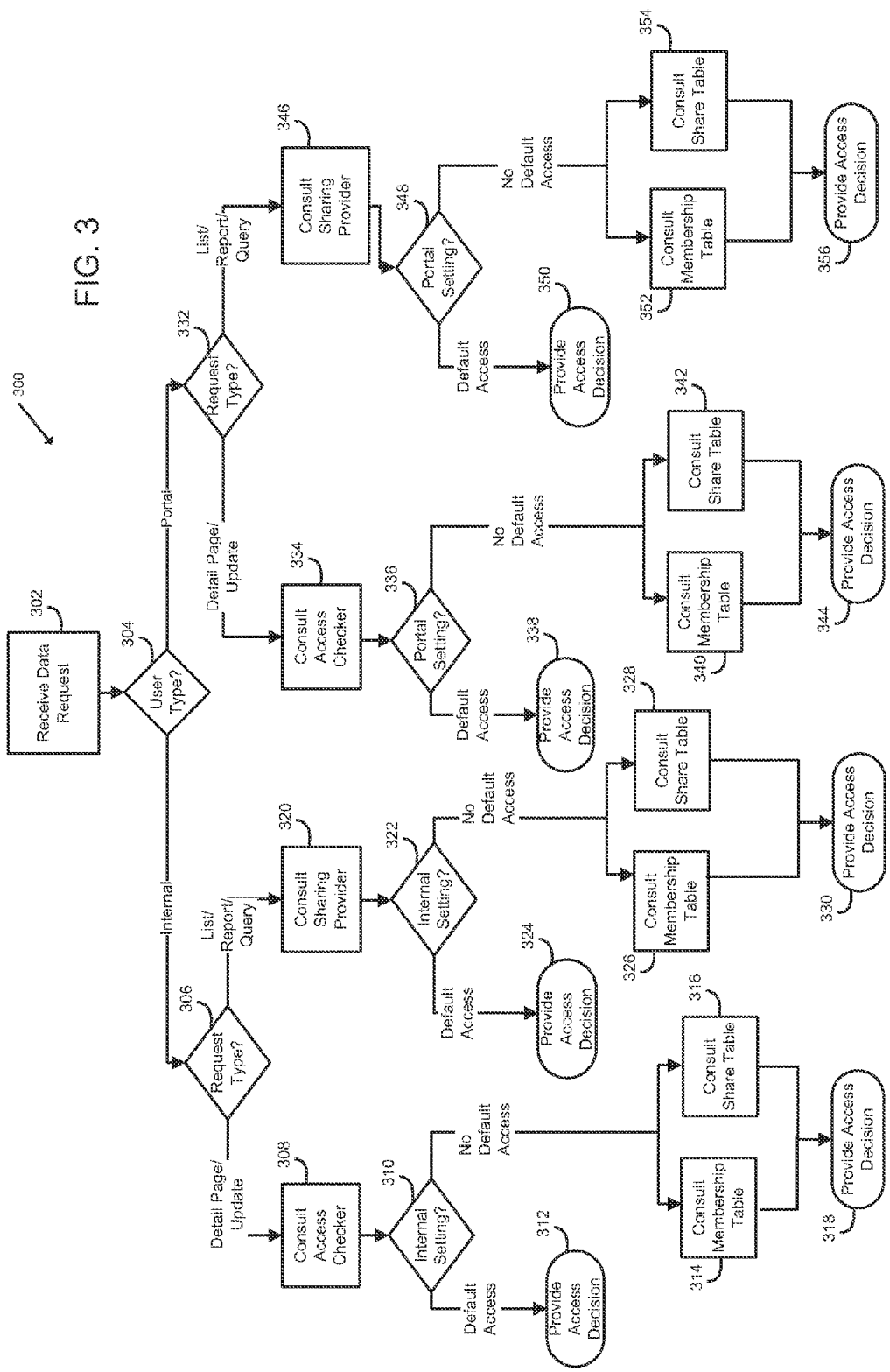
FIG. 3 is a flow chart of security configuration method in accordance with an exemplary embodiment.

Referring to FIG. 3 in addition to FIGS. 1 and 2, in an initial step 302, the system 100 receives a data request from a client device 140 or 142. In step 304, the user authorization module 118 identifies the client device 140 or 142 as an internal client device 140 or an external client device 142.

If the result of step 304 is that the request is associated with an internal client device 140, the request is evaluated to determine the type of access that the user is requesting in a step 306. If the internal client device 140 is requesting access to a record to update the record or potentially update the record, such as a detail page or an API update, the system 100 consults the access checker 220, as represented in step 308. In particular, in step 310, the access checker 220 consults internal security setting in column 234 of default table 230 is consulted to determine if the designated object is public or private, and if public, the level of available access.

If the security setting for the internal user in the organization wide default table 230 is public with respect to the access request, then the method 300 proceeds from step 310 to step 312 in which the security configuration 200 enables the system 100 to provide the access information to the user, which includes a yes or no access result to the user. If the access information indicates that the user has access, the system 100 subsequently provides the record to the user. As noted above, the security setting may have a particular level of access that is public. For example, if the record is public, but only as a read operation, an access request that may update the record would not be considered public.

If, in step 310, the system 100 determines that the security setting in the internal column 234 is private, the method 300 then determines if the user has access to the requested record in steps 314 and 316. In step 314, the membership table 250 is consulted to determine the groups or roles of which the user is a member. In step 316, the system 100 also consults the share table 260 that lists the groups that have access to each object and additionally defines access to records or objects for individual users. As such, from the membership table 250 and the share table 260, security configuration 200 provides the availability of the record for the user and access request. Based on the steps 314 and 316, the method 300 proceeds to step 318 and the system 100 provides the access information to the user, which includes a yes or no access result to the user. If the access information indicates that the user has access, the system 100 subsequently provides the record to the user.

Returning to step 306, if the access request of the internal user is querying the data, such as in a search or report, the system 100 consults the sharing provider 210, as represented in step 320. In the exemplary embodiment of FIG. 3, the decision of step 306 is based on a particular distinction about the nature of the access request, although in an alternate embodiment, any distinction may be provided in consulting the access checker 220 or sharing provider 210, or only a single query module or table may be used and steps such as step 306 may be omitted.

In step 322, the system 100 consults the security settings in the internal column 234 in the organization wide default table 230 of the access checker 210. If the security setting in the internal column 234 in the organization wide default table 230 is public with respect to the level of access requested, then the method 300 proceeds from step 322 to step 324 in which the security configuration 200 enables the system 100 to provide access information to the user, which includes a list of accessible records for the user.

If, in step 322, the system 100 determines that the security setting in the internal column 234 is private, the method 300 then determines if the user has access to the requested record in steps 326 and 328. In step 322, the membership table 250 is consulted to determine the groups or roles of which the user is a member, and in step 324, the share table 260 is consulted to determine the groups that have access to each object. As such, from the membership table 250 and the share table 260, security configuration 200 indicates the availability of the records. Based on the steps 326 and 328, the method 300 proceeds to step 330 and the system 100 provides the access information to the user, which includes a list of accessible records for the user.

Returning to step 304, if the request is associated with portal user, such as portal client device 142, the request is evaluated in step 332 to determine the nature of the access request, which as above, may be based on the potential to update the record. As shown in step 334, if the portal client device 142 is requesting to update the record or detail page, the system 100 consults the access checker 220. Particularly, the access checker 220 consults the portal security setting listed in portal column 238 of organization wide default table 230 in the access checker 220. In step 336, the system 100 evaluates if the portal security setting is public or private as compared to the access request.

If the security setting in the internal column 236 in the organization wide default table 230 is public with respect to the access request, then the method 300 proceeds from step 336 to step 338 in which the security configuration 200 enables the system 100 to provide the access information to the user, which includes a yes or no access result. If the access information indicates that the user has access, the system 100 subsequently provides the record to the user.

If, in step 336, the system 100 determines that the portal security setting in column 238 is private, the method 300 then determines if the user has access to the requested record in steps 340 and 342. In step 310, the membership table 250 is consulted to determine the groups or roles of which the user is a member, and in step 342, the share table 260 is consulted. As such, from the membership table 250 and the share table 260, security configuration 200 indicates the availability of the record, as represented by step 344. If the access information indicates that the user has access, the system 100 subsequently provides the record to the user.

Returning to step 332, if the portal user is requesting access to the records for a list, report, query, or the like, as above, the system 100 consults the sharing provider 210, as represented in step 346, which in turn, consults the portal security setting in column 236 of the default table 230, as represented in step 348. If the security setting is public with respect to the access request, then the method 300 proceeds from step 348 to step 350 in which the security configuration 200 enables the system 100 to provide access information to the user, which includes a list of accessible records for the user.

If, in step 348, the system 100 determines that the portal security setting in the column 236 is private, the method 300 then determines if the user has access to the requested records in steps 352 and 354. In step 352, the membership table 250 is consulted to determine the groups or roles of which the user is a member, and in step 354, the share table 260 lists the accessible objects for each such group. In step 356, the system 100 provides the access information to the user, which includes a list of accessible records for the user.

Accordingly, the security configuration 200 and method 300 provide an optimized response to an access request, while still ensuring that unauthorized users cannot access the data. In one exemplary embodiment, the security configuration 200, and particularly the organization wide default table 230, provides a default level of public access for both internal users and portal users of a tenant, which reduces the processing resources utilized for many type of access requests.

As mentioned above, the various functions and features of the process 300 may be carried out with any sort of hardware, software and/or firmware logic that is stored and/or executed on any platform. For example, various functions shown in FIG. 3 may be implemented using software or firmware logic that is stored as part of the application server 102 and database 130 of FIG. 1. The particular hardware, software and/or firmware logic that implements any of the various functions may vary from context to context, implementation to implementation, and embodiment to embodiment.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Thus, although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible processor-readable medium, which may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, comprising the steps of:
receiving a data request at a server with an application platform from a user via a user device, the data request being associated with a respective data object of a plurality of data objects stored in a database;
determining when the user is an internal user from a plurality of internal users of the application platform or when a portal user from a plurality of portal users of the application platform, the user additionally having a group membership in at least one of a plurality of groups;
consulting an organizational wide default table that stores a list of the data objects and, for each of the data objects, a first default security setting for all of the plurality of internal users regardless of the group membership and a second default security setting for all of the plurality of portal users regardless of the group membership, wherein the consulting step includes
consulting, when the user is the internal user, the first default security setting for the respective data object in the organizational wide default table to determine when the requested data is public or private, and
consulting, when the user is the portal user, the second default security setting for the respective data object in the organizational wide default table to determine when the requested data is public or private;
providing, when the user is the internal user and the requested data is public, access information to the user via the user device;
providing, when the user is the portal user and the requested data is public, access information to the user via the user device;
consulting, when the user is the internal user and only when the requested data is private, a membership table that includes a first listing of the groups associated with the user and a share table that includes a second listing of the groups that have access to the requested data, wherein the membership table and the share table are formed from tenant metadata, and providing the requested data to the user when the membership table and the share table indicates that the group membership of the user has access; and
consulting, when the user is the portal user and only when the requested data is private, the membership table and the share table, and providing the requested data to the user when the membership table and the share table indicates that the group membership of the user has access.

2. The method of claim 1, further comprising the step of evaluating the data request to determine a type of requested operation.

3. The method of claim 2, wherein the consulting step includes consulting the first default security setting or the second default security setting with respect to the type of requested operation.

4. The method of claim 3, wherein the evaluating step includes evaluating the data request to determine a first type of requested operation that includes updating the requested data and a second type of requested operation that includes reading the requested data.

5. The method of claim 4, wherein the consulting step includes consulting the first default security setting or second default security setting with an access checker when the data request is the first type of requested operation and consulting the first default security setting or the second default security setting with a sharing provider when the data request is the second type of requested operation.

6. The method of claim 1, further comprising the step of providing, when the requested data is public, the requested data to the user without consulting the membership table and the share table.

7. The method of claim 1, further comprising administering, by a tenant, the plurality of data objects stored in the database, wherein the portal users are external to the tenant and the internal users are internal to the tenant.

8. The method of claim 1, further comprising administering, by a tenant, the plurality of data objects stored in the database, wherein the portal users are customers or suppliers of the tenant and the internal users are employees of the tenant.

9. The method of claim 1, wherein the organizational wide default table includes a plurality of rows, each representing one of the data objects,
wherein, for each of the rows, a first column identifies the first default security setting for the respective data object for all of the plurality of internal users and a second column identifies the second default security setting for the respective data object for all of the plurality of portal users.

10. The method of claim 9, wherein the first default security setting is the single security setting for all of the plurality of internal users for the respective data object, and wherein the second default security setting is the single security setting for all of the plurality of portal users for the respective data object.

11. A multi-tenant data processing system, comprising:
a database that stores data specific to each one of a plurality of tenants such that at least two of the tenants store at least a portion of data specific to the at least two tenants as data objects in a common structure within the database, wherein each individual tenant is permitted access only to data associated with the individual tenant, and wherein a first tenant of the plurality of tenants is affiliated with an internal user from a plurality of internal users and a portal user from a plurality of portal users; and
an application server that receives, from one of the internal user or the portal user, a data request associated with a respective data object of the data objects stored in the database, the one of the internal user or the portal user additionally having a group membership in at least one of a plurality of groups,
wherein application server includes an organization wide default table that stores, for each data object, a first default security setting for all of the internal users regardless of the group membership and a second default security setting for all of the portal users regardless of the group membership,
wherein the application server is configurable to access a membership table that includes a listing of group memberships for each of the internal users and the portal users and a share table that includes access characteristics of each of the group memberships, the membership table and the share table being formed from tenant metadata;

wherein the application server is configured to consult, when the user is the internal user, the first default security setting for the respective data object in the organization wide default table to determine when the requested data is public or private, and when the user is the portal user, consult the second default security setting for the respective data object in the organization wide default table to determine when the requested data is public or private;

provide, when the requested data is public, the requested information based on the first default security setting for the respective data object or the second default security setting for the respective data object without performing additional security processing;

consulting, when the user is the internal user and only when the requested data is private, a membership table that includes a first listing of the groups associated with the user and a share table that includes a second listing of the groups that have access to the requested data, wherein the membership table and the share table are formed from tenant metadata, and providing the requested data to the user when the membership table and the share table indicates that the group membership of the user has access; and consulting, when the user is the portal user and only when the requested data is private, the membership table and the share table, and providing the requested data to the user when the membership table and the share table indicates that the group membership of the user has access.

12. The multi-tenant data processing system of claim 11, wherein the application server is configured to identify the data request as being received from the internal user or the portal user.

13. The multi-tenant data processing system of claim 11, wherein all of the portal users are customers or suppliers of the first tenant and all of the internal users are employees of the first tenant.

\* \* \* \* \*